H. M. A. HARDERS.
LABELING MACHINE.
APPLICATION FILED FEB. 26, 1912.

1,167,496.

Patented Jan. 11, 1916.
7 SHEETS—SHEET 4.

Fig. 4.

Witnesses:
Fred Palm
Chas. L. Gove.

Inventor:
Hartwig M. A. Harders,
By Sandus Bottum Fawcett Bottum
Attorneys.

H. M. A. HARDERS.
LABELING MACHINE.
APPLICATION FILED FEB. 26, 1912.

1,167,496.

Patented Jan. 11, 1916.
7 SHEETS—SHEET 6.

Witnesses:
Fred Palm
Chas. L. Goss

Inventor:
Hartwig M. A. Harders,
By Landers Bettum Lauretta Bettum
Attorneys.

UNITED STATES PATENT OFFICE.

HARTWIG M. A. HARDERS, OF MILWAUKEE, WISCONSIN, ASSIGNOR TO THE 20TH CENTURY MACHINERY CO., OF CHICAGO, ILLINOIS, A CORPORATION OF ILLINOIS.

LABELING-MACHINE.

1,167,496. Specification of Letters Patent. Patented Jan. 11, 1916.

Application filed February 26, 1912. Serial No. 679,927.

*To all whom it may concern:*

Be it known that I, HARTWIG M. A. HARDERS, a citizen of the United States, residing at Milwaukee, in the county of Milwaukee and State of Wisconsin, have invented certain new and useful Improvements in Labeling-Machines, of which the following is a specification, reference being had to the accompanying drawing, forming a part thereof.

The main object of this invention is to facilitate applying labels to bottles, cans and the like, and generally to improve the construction and operation of machines for this purpose.

It consists in the construction, arrangement and combination of parts as hereinafter particularly described and pointed out in the claims.

In the accompanying drawing like characters designate the same parts in the several figures.

Fig. 12 is a vertical section on the line 12 12, Fig. 13, showing a portion of a bottle carrier and delivery mechanism of a modified construction for wrapping labels completely or nearly around bottles, cans or the like.

Referring to Figs. 1 to 4 inclusive of the drawing, an endless belt or chain consisting of bottle holders $a$ linked together, is mounted on sprocket wheels or drums $b$ at or adjacent to the ends of a horizontal bed plate $c$ upon which the bottle holders $a$ rest and are guided at their lower ends. Along their inner sides between the drums $b$, the bottle holders $a$ are supported and held in place by guides $d$.

The bottle holders are open on the inner and outer sides and are formed or provided on the outer sides with vertically disposed gummers $e$ and $f$ for body labels and neck labels respectively. These gummers are located on opposite sides of the openings in the outer sides of the holders $a$. Each holder is also provided with a pair of spring clips $g$ for clasping and holding the bottles in place therein.

Figure 1:
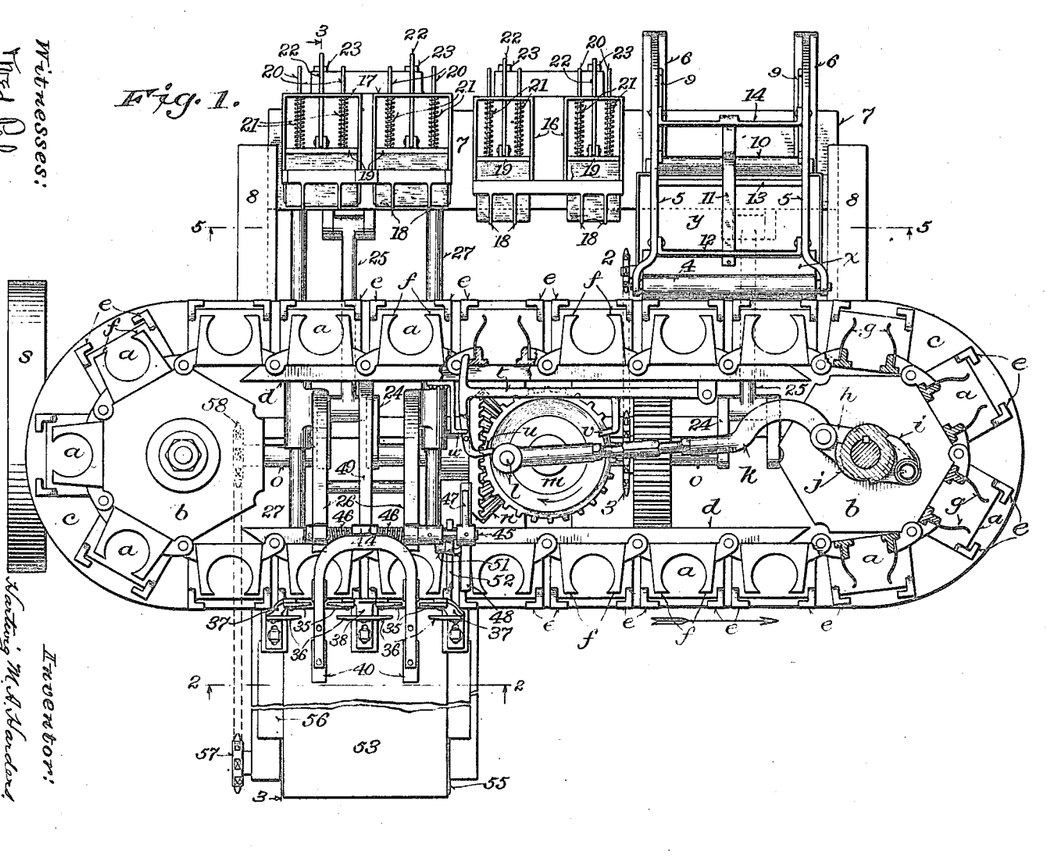
Figure 1 is a plan view of a machine embodying the invention certain parts being broken away and shown in section, particularly on the line 1 1, Fig. 2.
Figure 4:
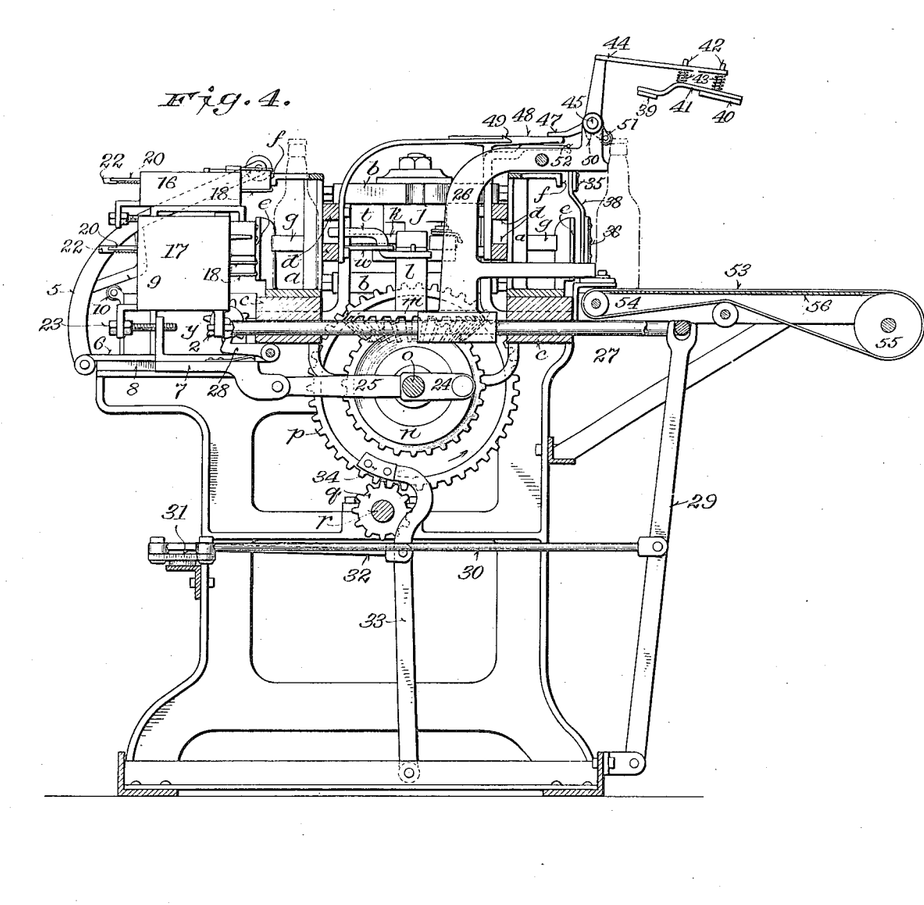
Fig. 4 is a similar section showing parts of the machine in different positions to illustrate their operation.

The bottle carrier is operated intermittently, being advanced in the present machine a distance corresponding with two bottle holders at a time, by the following mechanism: An oscillatory head $h$ loosely mounted on the shaft of one of the sprocket wheels or drums $b$, is provided with a spring pressed pawl $i$ engaging with a ratchet wheel $j$ fixed on said shaft. The head $h$ is connected by an adjustable rod $k$ with a crank pin $l$ on a bevel gear $m$ which meshes with a similar gear $n$ on a longitudinal crank shaft $o$. The shaft $o$ is provided with a spur gear $p$ which meshes with a pinion $q$ on a parallel driving shaft $r$ which is provided with a belt pulley $s$ for connecting it with any convenient source of power. The carrier is arrested and held in exact position after each forward movement by a stop $t$ pivoted at one end to the frame of the machine and provided at the other end with a cross piece, one end of which is adapted to be thrust into and out of the path of the upright members on the inner side of the bottle holders $a$. The cross piece of the stop terminates at its inner end in a pallet $u$, which by engagement with the hub of the rod $k$ on the crank pin $l$ thrusts the other end of the cross piece into the path of the advance upright member on the inner side of a bottle holder just before the completion of each advance movement of the carrier at every revolution of the gear $m$. The stop $t$ is also provided on the opposite side of the gear $m$ from the pallet $u$ with a pallet $v$ which by engagement with the hub on the crank pin $l$ withdraws the stop from the path of the bottle holders just before the completion of each return or backward movement of the head *h* and pawl *i*. The movement of the stop *t* is arrested at the proper limits by a stop *w* attached to one of the guides *d* and projecting therefrom between a pin or projection and an opposing shoulder on the cross piece of the stop *t*, as shown in Figs. 1 and 4.

Figure 3:
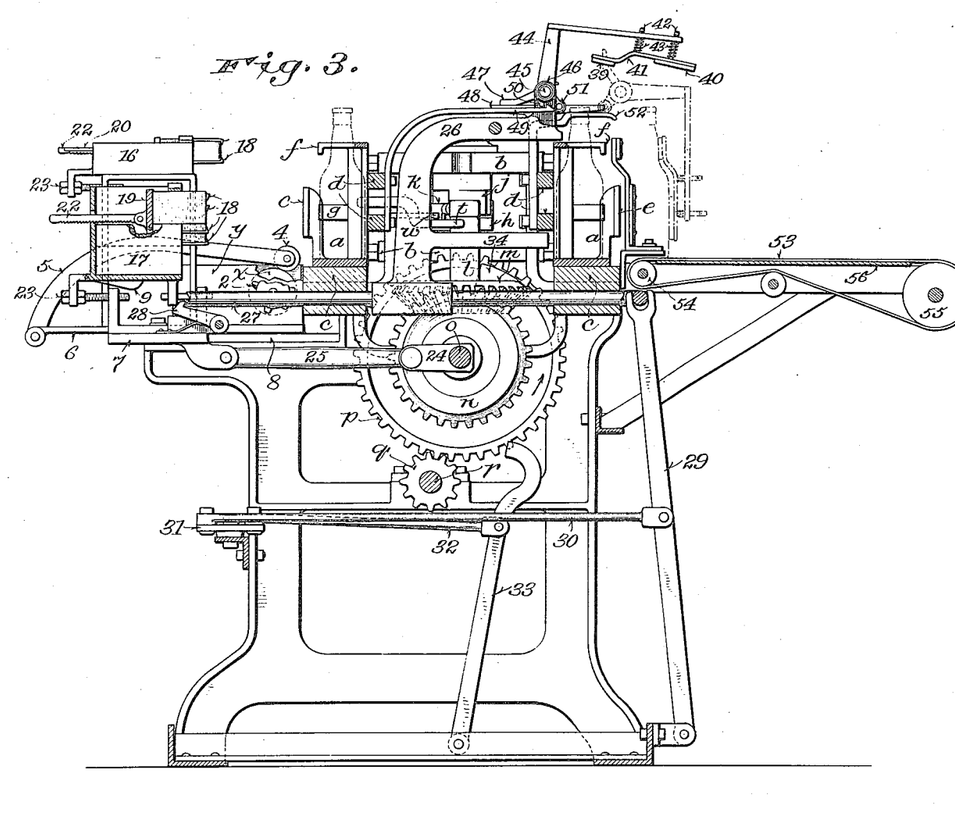
Fig. 3 is a vertical cross section of the machine on the line 3 3, Fig. 1.
Figure 5:
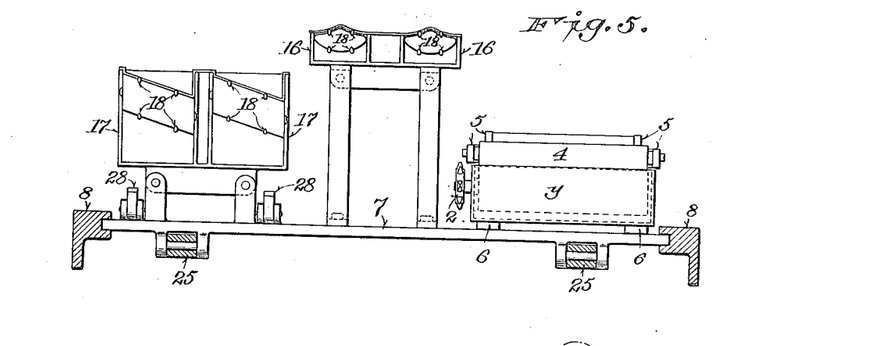
Fig. 5 is a vertical longitudinal section on the line 5 5, Fig. 1, showing the paste receptacle and mechanism and the label holders in front elevation.
Figure 6:
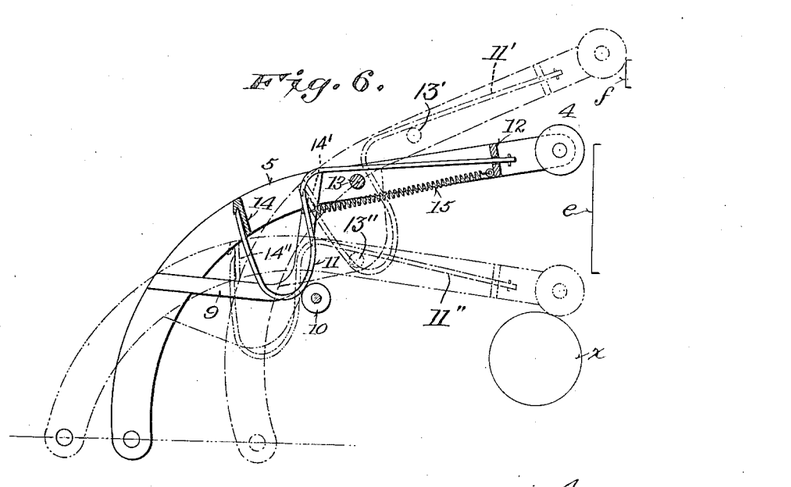
Figs. 6 and 7 are enlarged detail views illustrating the operation of the paste applying roller.

Paste is applied to the gummers *e* and *f* of two adjoining bottle holders simultaneously by the following mechanism: A rotary feed roll *x* is mounted so as to dip on its under side into the paste contained in a stationary basin or receptacle *y* adjacent to the rear side of the bottle carrier, as shown in Figs. 1 and 3. This roller is constantly rotated while the machine is in operation by a link belt connecting a sprocket wheel 2 on the roller shaft with a sprocket wheel 3 on the crank shaft *o*. A paste delivering and applying roller 4 mounted in the front end of a vertically swinging frame 5 rests normally in contact with the feed roller *x*, as shown in Figs. 3 and 5. The frame 5 is hinged at its rear end to rearwardly extending arms 6 on a reciprocative carriage 7, which is supported and guided at the ends in parallel ways 8 on the main frame, and is movable toward and from the rear side of the bottle carrier. To swing the frame 5 upward and carry the roller 4 from the feed roller *x* over and in contact with the faces of the gummers *e* and *f* on the opposite bottle holders with each advance movement of the carriage 7, said frame is provided as shown in Figs. 3, 4, 6 and 7 with cam guides 9 adapted to work with a stationary roller 10 at the rear side of the paste receptacle *y*. To prevent the roller 4 in its return movement from coming in contact with the gummers *e* and removing therefrom the paste applied thereto in the upward movement of the roller, the swinging frame 5 is provided with a cam guide 11 movably connected therewith and adapted to coöperate with the roller 10 on the return movement of the carriage 7 as shown by full lines in Fig. 6. The front end of the guide 11 passes loosely through an opening in a cross piece 12 of the frame 5 and normally rests, as indicated by dotted lines at 13″ in Fig. 6, on a cross piece 13 of said frame. Adjacent to its rear end the cam guide 11 is bowed downward to approximately correspond in shape with the cam guides 9. As shown by full lines in Fig. 6, the upwardly projecting rear end of the cam guide 11 is pointed or beveled to engage with an undercut notch or projection on the rear side of a cross piece 14 of the frame 5, and to hold the downwardly bowed portion of said guide projecting somewhat below and in advance of the guides 9 during the return movement of said frame with the carriage 7. The front part of the downwardly bowed portion of the cam guide 11 is connected with the cross piece 12 by a light spring 15, which tends to draw and hold the rear end of the guide forward against the rear side of the cross piece 14, as shown by full lines and indicated by dotted lines in Fig. 6.

On the carriage 7 are mounted a pair of boxlike neck-label holders 16, and a pair of similar body-label holders 17. Each of the several label holders is open on the front side toward the bottle carrier and provided with label retaining hooks 18 and a follower 19, as shown in Figs. 1, 3, 4 and 5. Each follower is provided with rearwardly projecting parallel rods 20 which pass through and are guided in the rear end of the label holder. Spiral springs 21 surrounding the rods 20 between the rear ends of the label holders and the followers 19, press the followers forward with the stacks or bunches of labels in front of them, against the hooks 18. A ratchet bar 22, pivoted at its front end to each follower and extending rearwardly therefrom through a vertically elongated opening in the rear end of the associated holder with which it engages, prevents backward movement of the follower when the labels are advanced with the carriage 7 and pressed against the gummers *e* and *f*.

To withdraw a follower for replenishing a holder with labels the rear end of the ratchet bar 22 is lifted to disengage the teeth on its under side from the rear end of the holder, the follower being drawn or pressed back against the tension of the springs 21. Each pair of label holders is adjustable relative to the carriage 7 toward and from the bottle carrier by means of screws 23, so that the front labels in the stacks or bunches may be properly positioned for engagement with and delivery to the gummers at the limit of the advance movement of the carriage 7. The carriage 7 with the devices mounted thereon, is moved forward once to each advance movement of the bottle carrier, by cranks 24 of the shaft *o*, which are connected with said carriage by rods 25. A reciprocative ejector 26 is mounted between the front and rear sides of the bottle carrier on parallel rods 27, which are guided in transverse bearings on the under side of the bed plate *c*, as shown in Figs. 1, 3 and 4. The ejector in the present case is made in two parts, each having upper and lower arms for engagement with the neck and body of a bottle, and is adapted to simultaneously thrust the bottles from two adjoining bottle holders *a*. It is moved forward simultaneously with the advance of the carriage 7 by hooks or pawls 28, pivoted on said carriage and normally held up by springs in position to engage with the rear ends of the rods 27, as shown in Fig. 3. The hooks or pawls 28 at the limit of the advance movement of the carriage 7, pass underneath the bearings of said rods on the under side of the bed plate c and are thereby turned down out of engagement with said rods, as shown in Fig. 4, so that the ejector may be returned to its initial position independently of the carriage 7.

Figure 2:
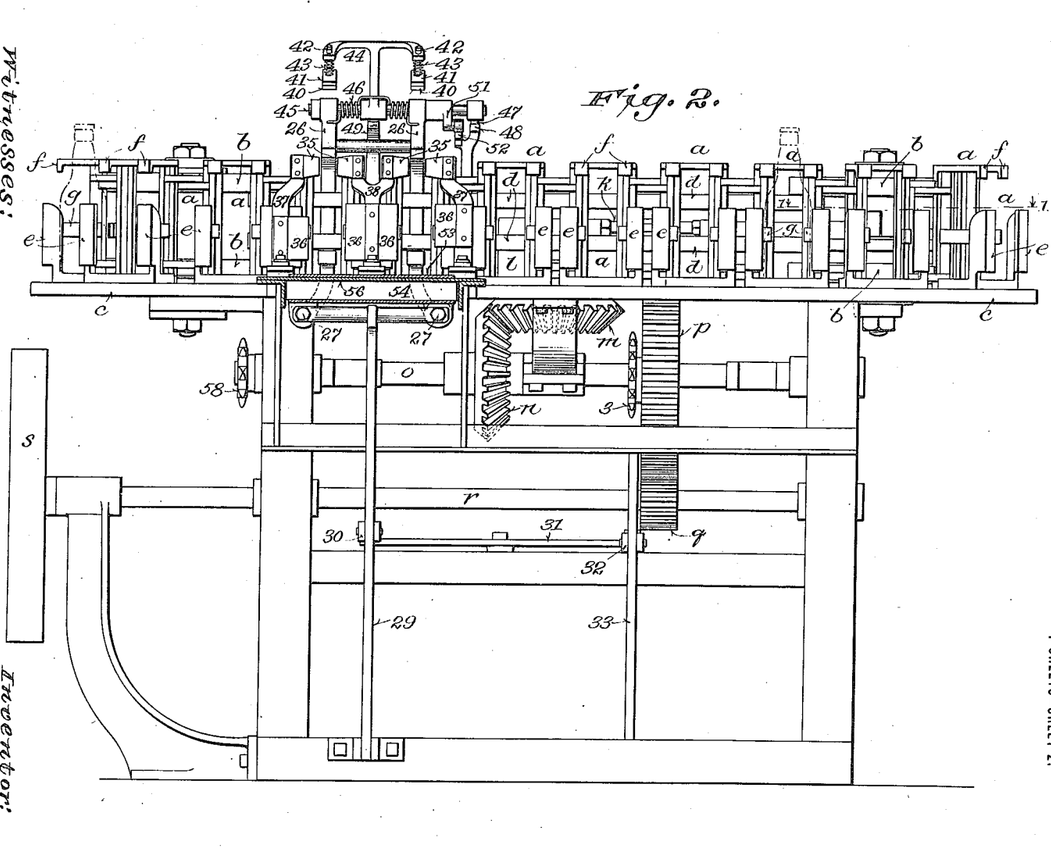
Fig. 2 is a front elevation of the machine, the delivery table and conveyer being shown in vertical cross section on the line 2 2, Fig. 1.

The return movement of the ejector is effected in advance of the return movement of the carriage 7 in order to permit the bottle carrier to be promptly advanced an interval after the discharge of bottles therefrom, by the following mechanism, shown most clearly in Figs. 2, 3 and 4: A lever 29 fulcrumed at its lower end on the base of the machine frame, is forked at its upper end and engages with a cross piece connecting the rods 27 at their front ends. This lever is connected by a rod 30 with one arm of a horizontal lever 31, which is fulcrumed between its ends on the rear side of the machine frame. The other arm of the lever 31 is connected by a rod 32 with a lever 33, which is fulcrumed at its lower end on the base of the machine frame and extends upwardly therefrom normally into the path of a lug 34 on the gear p.

To affix the labels to the bottles as the latter are thrust by the ejector 26 from the holders a, the machine is provided adjacent to the front side of the carrier and on both sides of the path of each part of the ejector, with flexible wipers 35 and 36 which are made of rubber or other suitable elastic material and are attached to standards 37 and 38 adjustably mounted on brackets attached to the bed plate c. These wipers are so constructed and arranged that as the bottles are thrust with the labels between them, they will press and wrap the pasted ends of the labels snugly against and around the necks and bodies of the bottles.

To hold the labels in place as they are withdrawn from the gummers by the ejected bottles and pass between the wipers, a presser consisting of pads 39 and 40 of rubber or other suitable material, is provided. These pads are attached to metal plates or bands 41, which are yieldingly connected by pins 42 and springs 43 with the branches of a forked and elbow-shaped arm 44. The arm 44 is fixed on a horizontal rocker shaft 45, which is journaled in bearings on the upper arms of the ejector 26. A spring 46 coiled around the shaft 45 and engaged at its ends with the bearings of said shaft and at an intermediate point with said arm, tends to swing the arm upwardly and to hold the presser pads 39 and 40 in an elevated position above the paths of the ejected bottles, as shown in Fig. 4 and by full lines in Fig. 3. The upward movement of the arm 44 is limited by the engagement of an arm 47 fixed on the rocker shaft 45, engaging with a horizontal bearing 48 which is attached to the front guides d or other stationary part of the machine. A spring hook 49 attached to the rear guides d in the path of a lug 50 on the hub of the arm 44, by engagement with said lug when the ejector is advanced, turns the arm 44 downward, carrying an arm 51 fixed on the rocker shaft 45 into engagement with a stationary cam guide 52, which is attached with the stop bearing 48 to the front guides d and by which the arm 44 is turned farther downward so as to carry the pads 39 and 40 into position, as indicated by dotted lines in Fig. 3, to press and hold the neck and body labels centrally against the bottles as they are removed from the bottle holders a and pass between the wipers 35 and 36. As the roller with which the arm 51 is provided, clears the front end of the cam guide 52, the spring 46 instantly turns the arm 44 upward, carrying the presser pads 39 and 40 out of the path of the ejected bottles, the upward movement of the arm 44 being arrested by the engagement of the arm 47 with the stop bearing 48. In the return movement of the ejector the arm 47 slides on the stop bearing 48, and the spring hook 49 yields downwardly, permitting the lug 50 to pass over it into its initial position, as shown by full lines in Fig. 3. The bottles are delivered by the ejector upon an endless conveyer belt 53, which is mounted upon rollers 54 and 55, and the upper side of which is supported between said rollers on a horizontal bed plate 56. The belt 53 is constantly driven when the machine is in operation, by the roller 55, which is connected by a link belt and sprocket wheels 57 and 58 with the crank shaft o, the upper side of the belt traveling away from the bottle carrier.

Referring to Figs. 8 to 11 inclusive, showing a bottle holder and gummers of a modified construction for use with comparatively short labels or labels which are shorter than the diameters of the bodies and necks of the bottles to be labeled, the gummers e' and f' which may be stamped from sheet metal, are formed or provided with rearwardly projecting ears or arms 59 and 60, which are pivotally mounted on vertical rods 61 on opposite sides of the holder a'. Springs 62 coiled around the rods 61 and engaging at one end with the holder and at the other end with inwardly projecting wings 63 of the gummers, tend to turn the gummers inwardly toward each other and to hold them in their normal or closed position, their inward movement being limited by stop pins or lugs 64 on the ears or arms 60 engaging with the base of the bottle holder. The gummers f' for the neck labels are in this case formed with the gummers e' for the body labels, and lie in the same vertical plane with the body label gummers. When the gummers are in their closed or normal position, as shown in the drawing, the width of the space between the body label gummers $e'$ is less than the diameter of the bodies of the bottles to be labeled. The same may or may not be the case with the neck label gummers $f'$ with respect to the diameter of the necks of the bottles. In either case, when bottles are ejected laterally from holders of this kind, the opposing gummers of each holder will yield away from each other, or open, permitting the bottles to pass between them.

Figure 12:
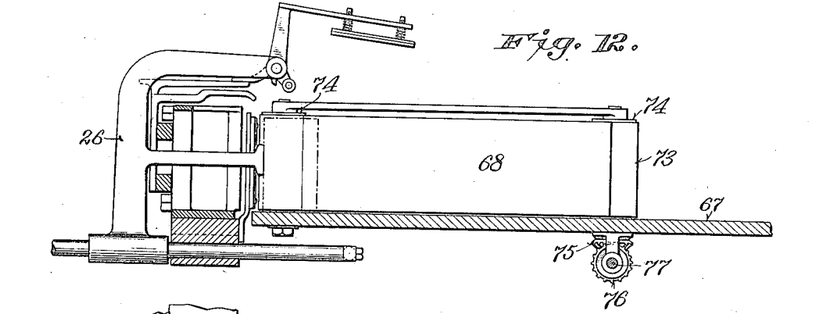
Figures 13, 14:
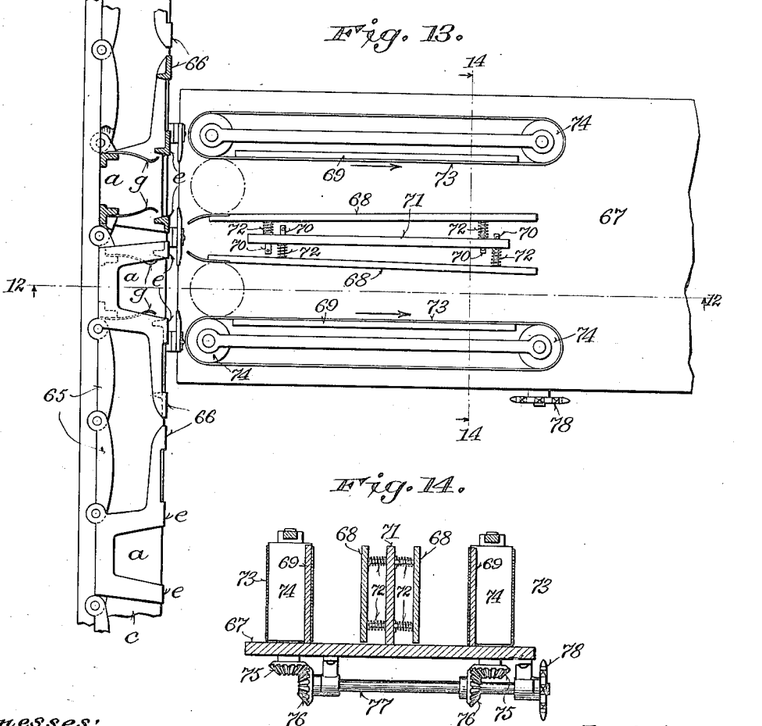
Fig. 13 is a plan view of the same.
Fig. 14 is a vertical section on the line 14 14, Fig. 13.

Referring to Figs. 12, 13 and 14, showing a modification of the bottle carrier and delivery mechanism for applying long labels to bottles, cans and the like, the holders $a$ are grouped in pairs and the holders of each pair are connected by links 65 and are formed or provided with auxiliary gummers 66 at one side of and a distance from the main or body label gummers $e$ on the adjacent sides of the holders. The bottles or cans are thrust by the ejector 26 from the holders $a$ upon a stationary horizontal leaf or table 67 between vertically disposed and outwardly converging plates or boards 68 and 69. The plates or boards 68 are provided on their backs with transverse rods 70, which are loosely fitted and guided in an intermediate vertical plate or support 71 fastened to and projecting upwardly from the table 67. Springs 72 placed on the rods 70 between the plates 68 and the intermediate plate 71, press the plates 68 yieldingly toward the opposing plates 69, their movement in that direction being limited by pins or cotters in the ends of the rods 70. Endless belts 73, mounted on vertically disposed rollers 74, with their inner sides opposite the plates 68, travel outwardly against the plates 69. The outer rollers 74 are provided at their lower ends with bevel gears 75 meshing with similar gears on a transverse horizontal shaft 77, which is connected by a sprocket wheel 78 and link belt with the sprocket wheel 58 or the like on the crank shaft $o$.

The machine according to the kind of receptacles to be labeled and the size or length of the labels to be applied thereto, is equipped with bottle holders and gummers and with delivery devices such as are shown in Figs. 1 and 2, in Figs. 8 to 11 inclusive, or in Figs. 12 to 14 inclusive.

Figure 7:
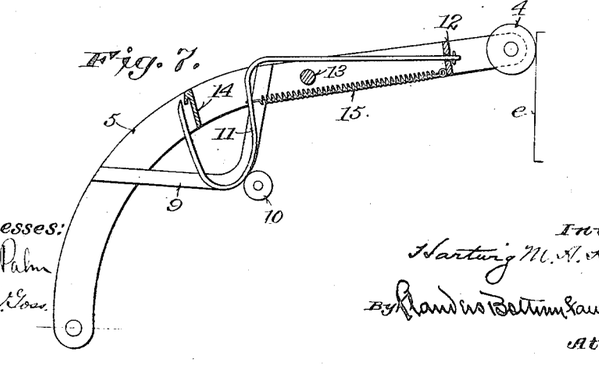
Figure 8:
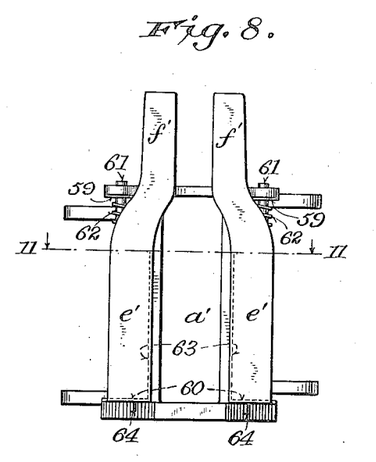
Fig. 8 is a front view of a bottle holder of modified construction.
Figure 9:
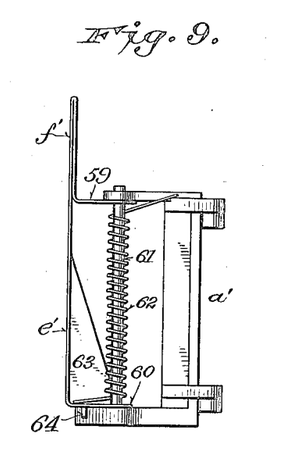
Fig. 9 is a side elevation of the same.
Figure 10:
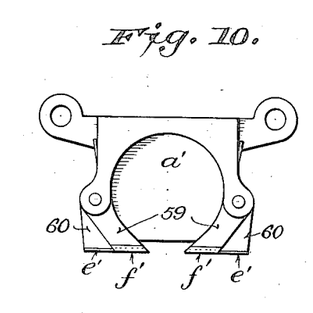
Fig. 10 is a top or plan view thereof.
Figure 11:
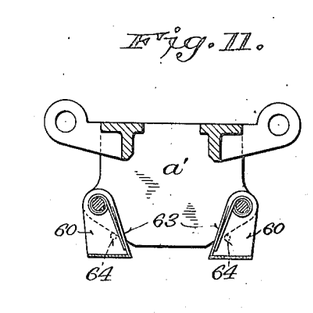
Fig. 11 is a cross section on the line 11 11, Fig. 8.

For applying to the bodies and necks of bottles, labels of a length somewhat greater than the diameter of the bottles, the machine constructed and equipped as shown in Figs. 1 to 7 inclusive, operates as follows: The bottles being placed by the operator in the holders $a$, after they pass the ejector 26 are conveyed to the right, as indicated by the arrow on Fig. 1, around that end of the machine, and thence to the left along the rear side thereof, past the paste receptacle $y$. With each advance movement of the carriage 7, the paste applying roller 4 is carried upward over and in contact with the gummers $e$ and $f$ of the two opposite bottle holders by engagement of the cam guides 9 with the roller 10, as shown in Fig. 7, thereby supplying the gummers with a thin coating of paste. During the foregoing movement of the roller 4 with the frame 5 the roller 10 pressing against the front side of the downwardly bowed portion of said cam guide, as shown in Fig. 7, stretches the spring 15 and thrusts the rear beveled end of said guide rearwardly and upwardly away from the cross piece 14 clear of the notch therein. As soon as said cam guide 11 in its advance movement clears the roller 10, it is drawn forward by the spring 15 and permitted to drop into the position indicated by dotted lines at 11', 13' and 14' relative to the cross pieces 13 and 14, such position corresponding with its initial position indicated by dotted lines at 11'', 13'' and 14'', Fig. 6. In the rearward return movement of the carriage 7 the downwardly bowed portion of the guide 11 engaging with the roller 10, and thrusting the rear beveled end of the guide upwardly into engagement with the notch in the cross piece 14, as shown by full lines in Fig. 6, holds the roller 4 as it descends to the feed roller $x$ out of contact with the gummers $e$, thereby preventing the removal or disturbance of the paste applied to them in the advance and upward movement of said roller, said guide resuming its initial position, as indicated by the dotted lines at 11'', 13'' and 14'' as soon as its downwardly bowed portion clears the roller 10. The two holders the gummers of which have been thus supplied with paste, being advanced an interval to the left opposite the label holders 16, the next advance movement of the carriage 7 deposits neck labels from said holders upon the gummers $f$. After the next advance movement of the carrier, body labels are deposited from the holders 17 upon the gummers $e$. The holders thus supplied with labels, pass around the end of the machine at the left into a position in front of and opposite the ejector 26, and while they dwell in this position the ejector is advanced, thrusting the bottles therefrom. As the bottles are moved forward between the gummers into contact with the labels held thereon, the pads 39 and 40 are turned down and press and hold the labels in place against the bottles, as indicated by dotted lines in Fig. 3, while the bottles are passing between the gummers and the pasted ends of the labels are withdrawn from the gummers and wrapped and pressed by the wipers 35 and 36 around and into close contact with the bottles. The pads 39 and 40 are then turned up with the arm 44 by the spring 46 out of the way, as shown by full lines in Figs. 3 and 4, and the bottles are moved forward on the belt 53 to make room for the discharge of other bottles from succeeding holders.

When the machine is equipped with holders like that shown in Figs. 8 to 11 inclusive, the operation of the machine is substantially the same, except that when the bottles are thrust by the ejector 26 out of the holders a', they spread or open the gummers e' and f', which are immediately returned to their original position or closed against the stops 64 by the springs 62, as soon as the bottles clear the gummers.

When the machine is equipped with a bottle carrier and delivery mechanism like that shown in Figs. 12, 13 and 14, for applying long labels to bottles, cans or the like, its operation is substantially the same as above described, except that when the bottles, cans or the like are thrust from the holders a between the yielding plates 68 and the opposing belts 73, they are rotated and moved outwardly upon the table 67, thereby wrapping the labels snugly around and pasting them to the bottles or the like.

Various changes in the details of construction and variations in the arrangement of parts of the machine to adapt it to operate upon receptacles of different sizes and shapes and to apply labels of different sizes and shapes thereto, may be made without departure from the principle and scope of the invention.

The term "bottle" as used in the following claims is intended to include other receptacles, such as cans and the like, which may be labeled in a machine of the kind herein shown and described.

I claim:

1. In a labeling machine the combination of a carrier having bottle holders provided with gummers, means for intermittently moving said carrier, a paste receptacle adjacent to the carrier, a paste roller adapted to receive paste from said receptacle and to apply the same to said gummers and means for intermittently moving said roller forward and back transversely to the travel of the opposite portion of the carrier and vertically over and in contact with the opposite gummers while they are at rest.

2. In a labeling machine the combination of a carrier having a series of bottle holders provided with gummers, means for intermittently operating said carrier, a paste receptacle adjacent to the carrier, a feed roller mounted in said receptacle, a paste applying roller adapted to take paste from said feed roller and apply the same to the gummers, and means for intermittently moving said paste applying rollers forward and back between said feed roller and opposite gummers and vertically over and in contact with said gummers while they are at rest.

3. In a labeling machine the combination of a carrier comprising bottle holders provided with gummers, means for moving said carrier intermittently, a paste receptacle adjacent to said carrier, a paste applying roller, and means adapted to carry said roller from said paste receptacle over and in contact with the gummers as they are brought into position opposite the paste receptacle and to return said roller out of contact with the gummers to the paste receptacle.

4. In a labeling machine the combination of a carrier comprising bottle holders provided with vertically disposed gummers, means for advancing said carrier intermittently, a paste receptacle adjacent to said carrier provided with a rotated feed roller, a reciprocative carriage movable transversely to the travel of the carrier, a vertically swinging frame pivoted to said carriage and provided with a paste applying roller held normally in contact with said feed roller, and a cam guide adapted to direct said paste applying roller upwardly from the feed roller over and in contact with the opposite gummers as said carriage advances toward the bottle carrier.

5. In a labeling machine the combination of an intermittently advancing bottle carrier comprising bottle holders provided with vertically disposed gummers, a paste receptacle adjacent to the carrier, a reciprocative carriage movable toward and from the carrier, and a vertically swinging frame provided with a roller for carrying paste from said receptacle to the gummers and with cam guides, one fixedly and the other movably attached to said frame and adapted by engagement with a relatively stationary part of the machine to direct said roller from the paste receptacle over and in contact with the gummers as the carriage advances toward the bottle carrier and back to the paste receptacle out of contact with the gummers on the return movement of the carriage.

6. In a labeling machine the combination of a bottle carrier comprising a series of bottle holders provided with gummers, means for moving said carrier intermittently, means for applying paste to the gummers, and a reciprocative label holder movable toward and from the carrier and provided with a relatively movable spring pressed follower and with a ratchet bar for locking the follower in place after each advance movement thereof by its spring, said holder being open on the side toward the carriage and provided with label retainers against which the front label is pressed and held by the spring actuated follower.

7. In a labeling machine the combination of an intermittently moving bottle carrier comprising a series of bottle holders provided with gummers, means for applying paste to the gummers, a reciprocative carriage movable toward and from the carrier, a label holder adjustable on said carriage transversely to the travel of the carrier, and provided with a spring pressed follower, a pivoted ratchet bar for locking said follower in place after each advance movement thereof by its spring, and an adjusting screw connecting the holder with the carriage.

8. In a labeling machine the combination of an intermittently moving bottle carrier comprising holders having openings in their inner and outer sides and provided with gummers on their outer sides, wipers adjacent to the outer side of the carrier and an ejector movable transversely to the travel of the carrier and adapted to thrust bottles therefrom between the wipers.

9. In a labeling machine the combination of an intermittently moving bottle carrier comprising bottle holders open on their inner and outer sides and provided with gummers on opposite sides of the openings in their outer sides, wipers adjacent to the outer side of the carrier, an ejector movable transversely to the travel of the carrier and adapted to thrust bottles therefrom between the wipers, and a presser movable into and out of the path of the bottles as they are ejected and adapted to hold the labels as they are withdrawn from the gummers against the bottles between the wipers.

10. In a labeling machine the combination of an intermittently moving bottle carrier, a reciprocative label holder and a reciprocative ejector movable in the same directions transversely to the travel of the carrier, and a connection between the label holder and ejector adapted to advance the ejector to thrust a bottle from the carrier as the holder is advanced to deliver a label to another part of the carrier while the carrier is at rest.

11. In a labeling machine the combination of an intermittently moving bottle carrier, a reciprocative ejector movable transversely to the travel of the carrier for removing bottles therefrom, a reciprocative label holder also movable transversely to the carrier, a dog adapted to connect said label holder with the ejector and to advance the latter simultaneously with the former, and a trip arranged to disengage said dog at the limit of its advance movement and permit the return of the ejector independently of the label holder.

12. In a labeling machine the combination of an intermittently moving bottle carrier, a reciprocative label holder and a reciprocative ejector movable transversely to the travel of the carrier, a connection for simultaneously advancing the ejector with the label holder, and means for returning the ejector to its initial position independently of the label holder.

13. In a labeling machine the combination of an intermittently moving carrier comprising bottle holders provided on opposite sides thereof with gummers, a reciprocative ejector movable transversely to the travel of the carrier, wipers between which bottles are thrust by the ejector from the carrier, a presser pivotally mounted on said ejector and provided with a crank arm, and a stationary cam guide adapted to turn said presser into position to hold a label against a bottle while it is being removed therewith from the carrier.

14. In a labeling machine the combination of an intermittently moving carrier comprising bottle holders provided with gummers, a reciprocative ejector movable transversely to the travel of the carrier, wipers between which the bottles are thrust by the ejector, and a pivotally mounted yielding presser operated by the movement of the ejector to hold the labels against the bottles as the latter are thrust by the ejector between the wipers and withdraw the labels from the gummers.

15. In a labeling machine the combination of an intermittently moving bottle carrier, a reciprocative ejector movable transversely to the travel of the carrier and adapted to thrust bottles therefrom while the carrier is at rest, means for affixing labels to the bottles as they are thrust by the ejector from the carrier, and an outwardly moving conveyer belt upon which the labeled bottles are delivered by the ejector from the carrier.

16. In a labeling machine the combination of a carrier provided with bottle holders open on one side for the discharge of bottles and each having at the sides of the opening laterally movable gummers, means for applying paste to the gummers, means for applying labels to the gummers across the openings between them, and an ejector movable transversely to the travel of the bottle holders and adapted to thrust bottles therefrom between the gummers and against the labels carried thereby.

17. In a labeling machine a carrier comprising bottle holders open on one side for the delivery of bottles and provided at the sides of the openings with outwardly yielding gummers pivoted thereto, springs tending to move the gummers of each holder toward each other, and stops for limiting such movement.

18. In a labeling machine a carrier comprising bottle holders having openings in one side for the delivery of bottles therefrom and gummers at opposite sides of said openings, each holder also having an auxiliary gummer for long labels located at one side and a distance from one of the other gummers.

19. In a labeling machine the combination of an intermittently moving bottle carrier comprising holders having openings in one side thereof and gummers on opposite sides of the openings, wipers adjacent to the path of the carrier, and an ejector movable transversely to the travel of the carrier and adapted to thrust bottles therefrom between the wipers.

20. In a labeling machine the combination of an intermittently moving carrier comprising bottle holders having openings on one side thereof and gummers on opposite sides of the openings, wipers adjacent to the path of the carrier, an ejector movable transversely to the travel of the carrier and adapted to thrust bottles therefrom between the wipers, and a presser movable into and out of the path of the bottles as they are ejected and adapted to hold the labels as they are withdrawn from the gummers against the bottles between the wipers.

In witness whereof I hereto affix my signature in presence of two witnesses.

HARTWIG M. A. HARDERS.

Witnesses:
  CHAS. L. GOSS,
  ALICE E. GOSS.